United States Patent
Steiner et al.

(10) Patent No.: US 8,759,442 B2
(45) Date of Patent: Jun. 24, 2014

(54) WATER BASED PRINTING INKS FOR NONWOVEN SUBSTRATES

(75) Inventors: Diane Steiner, Charlotte, NC (US); Tom DeBartolo, Waxhaw, NC (US); James Felsberg, Matthews, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 492 days.

(21) Appl. No.: 12/447,171

(22) PCT Filed: Oct. 31, 2007

(86) PCT No.: PCT/US2007/083098
§ 371 (c)(1),
(2), (4) Date: Apr. 24, 2009

(87) PCT Pub. No.: WO2008/060855
PCT Pub. Date: May 22, 2008

(65) Prior Publication Data
US 2010/0015412 A1    Jan. 21, 2010

Related U.S. Application Data

(60) Provisional application No. 60/865,267, filed on Nov. 10, 2006.

(51) Int. Cl.
*C08L 75/00* (2006.01)
*C09D 11/10* (2014.01)
*C09D 11/02* (2014.01)

(52) U.S. Cl.
CPC ............ *C09D 11/037* (2013.01); *C09D 11/102* (2013.01)
USPC ........ 524/591; 523/160; 428/195.1; 427/256; 427/288

(58) Field of Classification Search
USPC .......................................... 524/591; 523/160
See application file for complete search history.

(56) References Cited

U.S. PATENT DOCUMENTS

| | | | |
|---|---|---|---|
| 4,337,183 A | 6/1982 | Santiago | |
| 4,812,492 A | 3/1989 | Eckes et al. | |
| 5,310,780 A * | 5/1994 | Tomko et al. | 524/591 |
| 5,458,590 A | 10/1995 | Schleinz et al. | |
| 5,637,638 A * | 6/1997 | Chandler et al. | 524/591 |
| 5,695,855 A | 12/1997 | Yeo et al. | |
| 5,766,768 A | 6/1998 | Cummings et al. | |
| 5,853,859 A | 12/1998 | Levy et al. | |
| 6,001,906 A * | 12/1999 | Golumbic | 524/104 |
| 6,051,036 A | 4/2000 | Kusaki et al. | |
| 6,228,926 B1 * | 5/2001 | Golumbic | 524/489 |
| 2002/0146382 A1 * | 10/2002 | Mallo et al. | 424/70.122 |
| 2005/0118360 A1 * | 6/2005 | Huynh | 428/32.39 |
| 2005/0215662 A1 | 9/2005 | Masaro et al. | |
| 2006/0178446 A1 | 8/2006 | Bedat et al. | |
| 2007/0049683 A1 * | 3/2007 | Kim et al. | 524/507 |
| 2009/0318618 A1 | 12/2009 | Mori et al. | |

FOREIGN PATENT DOCUMENTS

| | | |
|---|---|---|
| EP | 0255078 | 2/1988 |
| EP | 0391663 | 10/1990 |
| EP | 0931802 A | 7/1999 |
| EP | 1270253 A | 1/2003 |
| EP | 1471122 | 10/2004 |
| EP | 1832632 A | 9/2007 |
| JP | 06-200149 | 7/1994 |
| JP | 06-206972 | 7/1994 |
| JP | 08-53527 | 2/1996 |
| JP | 2006-206669 | 8/2006 |
| JP | 2008-101162 | 5/2008 |
| WO | WO-02/051644 A1 | 7/2002 |
| WO | WO 03/046039 | 6/2003 |

* cited by examiner

*Primary Examiner* — Vu A Nguyen
(74) *Attorney, Agent, or Firm* — Charles C. Achkar; Ostrolenk Faber LLP

(57) ABSTRACT

Disclosed is a waterborne composition comprising of a water-based polyurethane, water, and colorant which can be used as a printing ink for non-woven articles.

15 Claims, No Drawings

WATER BASED PRINTING INKS FOR NONWOVEN SUBSTRATES

FIELD OF THE DISCLOSURE

The disclosure relates to water based printing inks for non-woven substrates.

BACKGROUND

There are many different incontinence disposable child and adult care products on the market including diapers, training under pants, and temporary swimsuits. Many of these products are constructed with nonwoven substrates including but not limited to nonwoven polyethylene or nonwoven polypropylene films. There is a desire within the marketplace to print graphics on these nonwoven substrates for appearance such as mere decoration or for utility such as indication of wetness. These substrates are typically printed with flexographic or rotogravure presses for these products, however, the printed inks have low color transfer resistance so as to discolor anything the nonwoven substrate may come into contact with such as clothing, carpet and furniture. The non-woven substrate is not porous such as paper and thus the printed ink easily transfers from the substrate onto contact substrates/objects. Thus, there is a desire for the printed graphics on nonwoven substrates to have augmented color transfer resistance properties.

Various inks have been used to print on non-woven substrates over the years, with limited success due to the substrate. A non-woven substrate is nonporous and thus the printed ink can easily transfer from the non-woven substrate onto contacted substrates or objects. Conventional printed inks have low color transfer resistance and thus have a tendency to discolor anything the non-woven substrate may come into contact with, such as clothing, carpet and furniture.

U.S. Pat. No. 5,458,590 describes printing solvent based block urethane inks on non-woven substrates. The block urethane ink system is composed of a block urethane resin, vinyl resin, wax and epoxidized soybean oil along with pigments and is not acceptable for human garment contact due to the specific block urethane used. U.S. Pat. No. 5,695,855 discloses adhesive inks used on non-woven products. U.S. Pat. No. 5,853,859 describes the combination of a latex polymer and pigment along with a cure promoter for improving colorfastness when exposed to liquids having a pH of 2-13. International Publication Number WO 02/051644 A1 discloses a cross linked ink with a cross-linked coating for use on nonwoven substrates.

However, the prior art technologies for printing on non-woven substrates are generally characterized by being dependent on the particular printing process or fail to exhibit the superior color transfer resistance properties needed for printings on the non-woven substrate in applications where they are subjected to abrasion. Non-woven substrates are typically used for many different incontinence disposable personal care products which include diapers, training under pants and temporary swimsuits where they are subjected to excessive rub and abrasion. There is an unmet need in the marketplace for printing inks suitable for printing graphics on non-woven substrates for appearance such as mere decoration, or for functional utility such as wetness indication, where the printed graphics have superior color transfer resistance properties. In addition, none of the prior art technologies employ water based ink technology for printing nonwoven substrates. Solvent based printing inks contain high levels of volatile organic compounds (VOC's), which limit their use to printers who are either permitted to release VOC's to the atmosphere or have solvent incineration equipment installed. For many printers, these limitations require them to use water based printing inks.

These needs and many others are met by a printing ink used on non-woven substrates comprised of a water based polyurethane resin, water, and colorant. Other advantages of the present composition will become apparent from the following description.

DETAILED DESCRIPTION

When the printing ink described herein is printed on nonwoven substrates, it exhibits and maintains excellent color transfer resistance properties, i.e., a rub resistance of at least 6. The printing ink is comprised of a water-based polyurethane resin, water, and colorant. It may also contain a compatible organic solvent in an amount of up to about 10%.

It has been discovered that waterborne polyurethanes, i.e., water based polyurethane and polyurethane-urea resins and dispersions, provide improved resistance properties when used in a water based printing ink on nonwoven substrates, as compared to water based ink systems formulated without the use of water based polyurethanes and polyurethane-ureas. The polyurethane may be present in an amount of from about 20 wt. % to about 70 wt. %. It is preferred that the polyurethane resin be present in an amount from about 40 wt. % to about 60 wt. %

The water based polyurethane resin is obtainable by reacting one or more isocyanates, such as a mixture of aliphatic diisocyanate and/or aromatic diisocyanate with one or more active hydrogen compounds, i.e., isocyanate-reactive components, which are preferably diols, and, optionally, one or more diamines. As used herein, a "water based polyurethane" is a polyurethane that is water soluble or disperable, and compatible with a waterborne ink composition, i.e., a system which contains about 20% VOC or less. Compatible means the colorant does not separate from the rest of the composition upon blending immediately or within an hour or so.

The term "aliphatic diisocyanate" is to be understood as to comprise straight or branched chain aliphatic as well as cycloaliphatic diisocyanates. Preferably, the diisocyanate comprises 1 to about 10 carbon atoms. Examples of preferred diisocyanates are 1,4-diisocyanatobutane, 1,6-diisocyanatohexane, 1,5-diisocyanato-2,2-dimethylpentane, 4-trimethyl-1,6-diisocyanatohexane, 1,10-diisocyanatodecane, 1,3- and 1,4-diisocyanatocyclo-hexane, 1-isocyanato-5-isocyanatomethyl-3,3,5-trimethylcyclohexane (isophorone diisocyanate (IPDI)), 2,3-2,4- and 2,6-diisocyanato-1-methylcyclohexane, 4,4'- and 2,4'-diisocyanatodicyclohexylmethane, 1-isocyanato-3-(4)-isocyanatomethyl-1-methyl-cyclohexane, 4,4'- and 2,4'-diisocyanatodiphenylmethane, and mixtures thereof, or 2,2,4- or 2,4,4 trimethyldiisocyanatohexane (TMDI).

The term "aromatic diisocyanate" is to be understood as including both aromatic as well as cycloaromatic diisocyanates, which may also include aliphatic moieties. Preferably, the diisocyanate comprises 1 to about 10 carbon atoms. Examples of preferred diisocyanates are 1,1'-methylenebis [4-isocyanato-benzene (MDI), 1,6-diisocyanato-hexane (HDI), and 1,3-diisocyanatomethyl-benzene (TDI).

The diols used to form the polyurethane resin of present invention are generally defined by the formula $R(OH)_2$, wherein R is a straight chain or branched hydrocarbon group. Examples of preferred diols include the polyethylene glycols (PEG), polypropylene glycols (PPG), dimethylolpropionic acid (DMPA), polytetramethylene ether glycols (Poly-THF), 1,4-butanediol, 1,6-hexanediol, neopentyl glycol, as well as mixtures thereof. According to the present invention, the use of DMPA and Poly-THF is particularly preferred. Other diol components that may be utilized include polyester diols and polycaprolactone diols.

Optionally, at least one monoamine or diamine can be employed as a further isocyanate-reactive component. The monoamine or diamine can be any aliphatic, cycloaliphatic, aromatic, or heterocyclic diamine having one or more primary or secondary amino groups. Examples are ethylenediamine, 1,2-diaminopropane, 1,3-diaminopropane, diaminobutane, hexamethylenediamine, 1,4-diaminocyclohexane, 3-aminomethyl-3,5,5-trimethylcyclohexylamine (isophorone diamine), m-xylylene diamine, hydrazine, or 1,3-bis (aminomethyl)cyclohexane.

The water based polyurethane and/or polyurethane-urea is provided as a liquid material, and can contain water, alkaline substances such as ammonium hydroxide or triethylamine, and, optionally, processing solvents such as, but not limited to, dimethylformamide (DMF).

Other compatible resins can also be present if desired as long their presence as such or amount of their presence does not adversely effect the color transfer resistance. For example, nitrocellulose resins, acrylic resins and emulsions, polyesters, styrene-maleic anhydride resins and half esters, and other water compatible polymers can be employed, although the acrylics, usually depending on concentration, tend to adversely effect color transfer resistance. The other resins, when present, will generally be in an amount up to about 15 wt. %, preferably between about 1 wt. % to about 10 wt. %.

In addition to the water, alcohol solvent(s) can also be present. Such alcohol solvents include but are not limited to ethanol, propanol, isopropanol, glycol ethers, 1-ethoxy-2-propanol, propylene glycol n-propyl ether, dipropylene glycol, n-butyl ether, dipropylene glycol ethyl ether, diacetone alcohol, methyl amyl alcohol, diethylene glycol monobutyl ether, propylene glycol methyl ether and the like and combinations thereof. It is preferred that when present, the alcohol solvent is propanol, and more preferred ethanol. The alcohol solvent may be present in an amount of from about 0 wt. % to about 10 wt. %. It is preferred that the alcohol solvent be present in an amount from about 0 wt. % to about 5 wt. %, and more preferred from about 0 wt. % to about 2 wt %.

Suitable colorants include, but are not limited to, dyes, organic or inorganic pigments. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83; Pigment Red Numbers 2, 22, 23, 48:1, 48:2, 52, 53, 57:1, 122, 166, 170, 266; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired. The colorant is usually present in an amount from about 0.1 wt. % to about 40 wt. %. It is preferred that the colorant be present in an amount from about 0.1 wt. % to about 20 wt. %. These may be incorporated into the test inks as a dispersion which can use different dispersing agents.

The printing ink may also include waxes such as but not limited to amide wax, erucamide wax, polypropylene wax, paraffin wax, polyethylene wax, teflon, carnuba wax and the like. The wax may be a combination of said waxes. It is preferred that the wax be a blend of amide and erucamide waxes. The wax, if present, is in an amount of up to about 4 wt. %. It is preferred that the wax be present in an amount from about 0 wt. % to about 2 wt. %.

As with many printing inks, other additives, alone or in combination may be employed, including but not limited to, ammonia, defoamers, stabilizers, silicones, plasticizers and the like.

The components of the printing ink may be mixed in any order of components. Typically, a pigment dispersion is combined with an ink vehicle containing resins and solvents. Another example may include a pigment dispersion created by combining the pigment with surfactant, solvent and then this dispersion is combined with a polyurethane resin.

The water based printing ink imparts excellent color transfer resistance when printed on non-woven substrates. The non-woven substrate may be comprised of a substrate such as polyethylene films, polypropylene films, polyester films, nylons and the like, as well as combinations thereof. The non-woven substrates may also be comprised of polymers, copolymers, natural fibers, as well as air laid, wet laid, solution spun fiber webs, and the like, in the form of, for example, a polyethylene or polypropylene film.

The articles of manufacture incorporating the printed ink may be found on a variety of products including but not limited to personal care products, such as diapers, training pants, wipes, feminine pads, adult incontinence garments, as well as hospital gowns and medical gowns and related products, and clothing such as work clothing and cleaning garments, and the like. The printing ink may be printed onto the non-woven substrate via any established direct or indirect printing method, including but not limited to flexographic, rotogravure, jet, lithographic.

The printing inks are further illustrated by the following non-limiting examples in which all parts and percentages are by weight, and all temperatures in degrees Centigrade unless otherwise indicated.

Example 1

A printing ink was prepared by combining 40 parts of an aliphatic chain extended polyurethane-urea having a non-volatile content of 36% and an acid value of 42 (manufactured by Sun Chemical of Parsippany N.J.), 50 parts of Pigment Blue 15:3 surfactant based dispersion (manufactured by Sun Chemical of Cincinnati, Ohio), 9.8 parts water and 0.2 parts of a defoamer (DC 62, manufactured by Dow Corning of Midland, Mich.).

Example 2

The printing ink of Example 1 and conventional gravure/flexo printing inks containing other resins and additives including defoamers, stabilizers, plasticizers, titanates, silicones and/or clay were test to determine if they were color transfer resistant. The compositions and ratings are shown in Table 1 below. Ink Example 2A through 2C are conventional ink formulas and contain the same polyurethane as Example 1. Example 2D is a conventional ink currently used on non-woven substrates.

The printing inks were visually observed for color transfer resistance. Color transfer resistance was tested by printing an ink on a composite polyethylene/polypropylene non-woven substrate and visually observed. The printed non-woven substrate was mounted on a Sutherland Rub tester (manufactured by KVP Sutherland Paper Co. of Kalamazoo, Mich.) rubbed against a white linen swatch and visually evaluated by ten individuals for how much color was transferred from the printed non-woven substrate to the linen. The inks were then ranked from 1 to 10, with ten being the highest or best ranking, for color transfer resistance which typically means no amount of color was visually observed to have transferred onto the white linen swatch. A rank of 1 indicated visual observation of complete color transfer onto the white linen swatch. The ten ratings were averaged and then rounded to the nearest integer. A rank of 6 or greater (before rounding) means the composition was color transfer resistant.

TABLE 1

| Component | Example 1 | 2A | 2B | 2C | 2D |
|---|---|---|---|---|---|
| Polyurethane | 49.8 | 19.25 | 19.25 | 27 | |
| Styrene-Maleic Anhydride resin[a] | | | 7.5 | | |
| Rosin acrylic resin[b] | | | | 9 | |
| Polyester[c] | | 19.25 | 13.75 | | |
| Styrene Acrylic varnish[d] | | | | | 17.1 |
| Ethanol | | 5 | 1.25 | 7.29 | |
| mono propylene glycol | | | | | 2.0 |
| Water | | 6 | 5 | 1.71 | 20.1 |
| Ammonia | | 0.25 | 0.5 | | |
| blue dispersion[e] | | 50 | 50 | 50 | |
| blue dispersion[f] | 50 | | | | |
| blue dispersion[g] | | | | | 43.0 |
| antifoam[h] | | 0.125 | 0.125 | | |
| antifoam[i] | | 0.125 | 0.125 | | |
| Sorbital solution - drying agent[j] | | | 2.5 | | |
| clay[k] | | | | 5 | |
| Silicone defoamer[l] | 0.2 | | | | |
| Polyether siloxane copolymer - defoamer[m] | | | | | 0.5 |
| Ethyleneamine, EO/PO polymer - surfactant solution[n] | | | | | 4.0 |
| Ethyloxyated fatty alcohol - surfactant solution[o] | | | | | 10.0 |
| biocide[p] | | | | | 0.3 |
| Rub Rating 1-10 | 9 | 4 | 3 | 2 | 6 |

[a]SMA 17352H Sartomer Co. of Exton, PA
[b]TV94-5991 Sun Chemical of Fort Lee, NJ
[c]R2764-133 Sun Chemical of Fort Lee, NJ
[d]VR4015W Sun Chemical, Rochdale, UK
[e]B15:3/acrylic/surfactant Sun Chemical of Cincinnati, OH
[f]B15:3/surfactant Sun Chemical of Cincinnati, OH
[g]Profita Blue Profita Development Products Ltd., China (B15:3/styrenated acrylic dispersion)
[h]Nalco 2303 Nalco Chemical of Naperville, IL
[i]Dapro DF-975 Elementis Specialties of Highstown, NJ
[j]Sorbitol Solution Univar of Kirkland, WA
[k]ASP 600 A.E. Fleming of Warren, MI
[l]DC 62 Dow Corning
[m]Tego Foamex 3062 Degussa, Goldschmidt UK
[n]VR4911W Sun Chemical, Rochdale, UK
[o]VR5382W Sun Chemical, Rochdale, UK
[p]Acticide MBS Thor Chemicals Example 3

Additional inks containing the polyurethane employed in Example 1 were prepared and compared to other inks containing different resin chemistries. Each ink was printed on a composite polyethylene/polypropylene non-woven substrate and visually observed for color transference pursuant to the test method of Example 2. The results are set forth in Table 2 below.

TABLE 2

| Component | Example 1 | 3A | 3B | 3C | 3D | 3E | 3F | 3G | 3H | 3I | 3J | 3K | 3L |
|---|---|---|---|---|---|---|---|---|---|---|---|---|---|
| Polyethylene wax[a] | | 49.8 | | | | | | | | | | | |
| Polyurethane | 49.8 | | 34.8 | | | 34.8 | 49.8 | | | | | 49.8 | 49.8 |
| Styrenated acrylic varnish[b] | | | | 49.8 | 49.8 | | | | | | | | |
| Self crosslinking acrylic resin[c] | | | | | | | | 49.8 | | | | | |
| Alcohol soluble polyamide in H$_2$O/amine[d] | | | | | | | | | 47.8 | | | | |
| Polyamide/acrylic blend[e] | | | | | | | | | | 49.8 | | | |
| Styrenated acrylic[f] | | | | | | | | | | | 49.8 | | |
| Water | | | 15 | | | 15 | | | 2 | | | | |
| Blue (B15:3/surfactant) dispersion[g] | | 50 | 50 | | 50 | | | | | | | | |
| Yellow (Y14 styrenated acrylic) dispersion[h] | | | | 50 | | 50 | | | | | | | |
| Yellow (Y74 stryenated acrylic) dispersion[i] | | | | | | | 50 | 50 | 50 | 50 | 50 | | |
| Blue (B15:3/acrylic) dispersion[j] | | | | | | | | | | | | 50 | |
| Blue (B15:3) dispersion[k] | | | | | | | | | | | | | 50 |
| Blue (B15:3/surfactant) dispersion[l] | 50 | | | | | | | | | | | | |
| Silicone antifoam emulsion[m] | 0.2 | 0.2 | 0.2 | 0.2 | 0.2 | 0.2 | 0.2 | 0.2 | 0.2 | 0.2 | 0.2 | 0.2 | 0.2 |
| Rub Rating | 8 | 1 | 8 | 3 | 2 | 6 | 7 | 5 | 6 | 6 | 2 | 7 | 8 |

[a]Jonwax 26, manufactured by Johnson Polymer of Sturtevant, WI
[b]RD10, manufactured by Coates Inc., Rochdale, UK
[c]Joncryl 1972, manufactured by Johnson Polymer of Sturtevant, WI
[d]Casamid SP1914, manufactured by
[e]12040BCH
[f]Arolon 01
[g]BHD-6000, manufactured by Sun Chemical, Cincinnati, OH (surfactant)
[h]TPQ2074, manufactured by Coats Inc., Rochdale, UK
[i]YHD-6020, manufactured by Sun Chemical, Cincinnati, OH (surfactant)
[j]BGD-2015, manufactured by Sun Chemical, Cincinnati, OH (resinated)
[k]BAD-7560, manufactured by Sun Chemical, Cincinnati, OH
[l]BPD-9777, manufactured by Sun Chemical, Cincinnati, OH (APE free)
[m]DC 62, manufactured by Dow Corning, Midland, MI

Example 4

Additional inks containing the polyurethane employed in Example 1 were prepared and compared to other inks containing different color dispersion chemistries. Each ink was printed on a composite polyethylene/polypropylene non-woven substrate and visually observed for color transference pursuant to the test method of Example 2. The results are set forth in Table 3 below.

TABLE 3

| Component | Example 1 | 4A | 4B | 4C | 4D | 4E |
|---|---|---|---|---|---|---|
| Polyurethane | 49.8 | 49.8 | 49.8 | 49.8 | 49.8 | 49.8 |
| Silicone antifoam emulsion[a] | 0.2 | 0.2 | 0.2 | 0.2 | 0.2 | 0.2 |
| B15:3 acrylic dispersion[b] | | | 50 | | | |
| B15:3 acrylic emulsion based dispersion[c] | | | | 50 | | |
| B15:3 surfactant/glycol based dispersion[d] | | | | | | |
| B15:3 surfactant based dispersion, glycol free[e] | | 50 | | | | |
| B15:3 surfactant based dispersion, APE free[f] | 50 | | | | | |
| B15:3 surfactant/acrylic based dispersion[g] | | | | | | 50 |
| B15:3 epoxy ester based dispersion[h] | | | | | 50 | |
| Rating | 8 | 9 | 7 | 4 | 5 | 5 |

[a]DC62, manufactured by Dow Corning of Midland, MI
[b]Flexiverse III, manufactured by Sun Chemical of Cincinnati, OH
[c]Aquasurf manufactured by Sun Chemical of Cincinnati, OH
[d]BWD-1164, manufactured by Sun Chemical of Cincinnati, OH
[e]BHD-6015, manufactured by Sun Chemical of Cincinnati, OH
[f]APE-Free, manufactured by Sun Chemical of Cincinnati, OH
[g]BCD09749, manufactured by Sun Chemical of Cincinnati, OH
[h]Decosperse EP, manufactured by Decorative Color & Chemical of Doylestown, PA

Example 5

Waterborne printing inks are prepared by combining 49.2 parts of either Hybridur 580 (an acrylic urethane hybrid blend) or Hybridur 570 (also an acrylic urethane hybrid blend), 50 parts of a glycol free Pigment Blue 15:3 surfactant based dispersion (manufactured by Sun Chemical of Cincinnati, Ohio), and 0.2 parts of a defoamer (DC 62, manufactured by Dow Corning of Midland, Mich.).

Various changes and modifications can be made in the composition of the present invention as well as its preparation and use without departing from the spirit and scope hereof. The variously embodiments disclosed herein were for the purpose of illustration only and were not intended to be limiting.

What is claimed is:

1. A waterborne composition comprising a color transfer resistant combination of water based polyurethane between 12.24-18.00 wt. %, water, wax and colorant, wherein the colorant is selected from the group consisting of a pigment, a combination of pigments, a dye or a combination of dyes, and combinations thereof; wherein the composition exhibits a rub rating of at least 6, when applied to a non-woven substrate; and wherein the polyurethane is one or more polyurethane-urea.

2. The composition of claim 1, wherein the colorant is about 0.1 to 40% wt. %.

3. The composition of claim 1, wherein the colorant is about 0.1 to 20% wt. %.

4. The composition of claim 1, further comprising alcohol up to about 10% wt. %.

5. The composition of claim 1, further comprising alcohol up to about 5 wt. %.

6. The composition of any claim 1, further comprising alcohol up to about 2 wt. %.

7. An ink comprising a waterborne composition of claim 1 and at least one ink component.

8. An article comprising a substrate in combination with the waterborne composition of claim 1.

9. The article of claim 8 in which the substrate is a non-woven.

10. The article of claim 9 in which said composition is disposed on a surface of the substrate in a pattern.

11. A process of printing comprising applying an ink to a substrate, wherein the ink employs the composition of claim 1.

12. The process of claim 11 in which the substrate is a non-woven.

13. A method of making the waterborne composition of claim 1 comprising combining the components of the composition of claim 1; wherein the wax is present in an amount up to 4 wt. %.

14. The method of claim 13, further combining an ink component; and the resulting combination is an ink.

15. The composition of claim 1 wherein the colorant is selected from the group consisting of Pigment Yellow 12, Pigment Yellow 13, Pigment Yellow 14, Pigment Yellow 17, Pigment Yellow 74, Pigment Yellow 83, Pigment Red 2, Pigment Red 22, Pigment Red 23, Pigment Red 48:1, Pigment Red 48:2, Pigment Red 52, Pigment Red 53, Pigment Red 57:1, Pigment Red 122, Pigment Red 166, Pigment Red 170, Pigment Red 266, Pigment Orange 5, Pigment Orange 16, Pigment Orange 34, Pigment Orange 36, Pigment Blue 15:3, Pigment Blue 15:4, Pigment Violet 3, Pigment Violet 27, Pigment Green 7, iron oxides, Pigment White 6, Pigment White 7, Pigment Black 7, azo dye, anthraquinone dye, xanthene dye, azine dye, and combinations thereof.

* * * * *